US007542620B1

(12) United States Patent
Bilbrey et al.

(10) Patent No.: US 7,542,620 B1
(45) Date of Patent: Jun. 2, 2009

(54) ROBUST TEMPORAL DITHERING AND FILTERING

(75) Inventors: Brett Bilbrey, Sunnyvale, CA (US); Alexei V. Ouzilevski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 849 days.

(21) Appl. No.: 10/919,918

(22) Filed: Aug. 16, 2004

(51) Int. Cl.
*G06K 9/40* (2006.01)
*H04N 7/12* (2006.01)

(52) U.S. Cl. ...................................... 382/268; 382/264

(58) Field of Classification Search ................. 382/268, 382/199, 266, 267, 269; 345/690
See application file for complete search history.

(56) References Cited

U.S. PATENT DOCUMENTS 4,730,185 A * 3/1988 Springer et al. ............. 345/536
4,901,265 A * 2/1990 Kerr et al. .................... 708/276
5,600,731 A * 2/1997 Sezan et al. .................. 382/107
6,040,876 A * 3/2000 Pettitt et al. .................. 348/624
6,101,001 A * 8/2000 Tresser et al. ................ 358/1.9
6,476,824 B1 * 11/2002 Suzuki et al. ............... 345/690
6,868,108 B1 * 3/2005 Clark .......................... 375/130
6,894,664 B2 * 5/2005 Thebault et al. ............... 345/60
2002/0001416 A1 * 1/2002 Zhou et al. .................. 382/268
2003/0142878 A1 * 7/2003 Willis et al. ................. 382/269
2005/0152614 A1 * 7/2005 Daly et al. .................. 382/268

* cited by examiner

*Primary Examiner*—Samir A. Ahmed
*Assistant Examiner*—Michael Vanchy, Jr
(74) *Attorney, Agent, or Firm*—Fenwick & West LLP

(57) ABSTRACT

A temporal dithering manager uses temporal dithering to reduce contouring artifacts due to bit limiting. The temporal dithering manager truncates low order bits of an input signal, creates a temporal dither signal based on the truncated low order bits and applies the temporally created dither signal to the truncated signal. A temporal filtering manager applies a temporal filter to the truncated signal, thereby improving the quality of the truncated signal. The temporal dithering can be applied at a preprocessing stage, and the temporal filtering at a post-processing stage.

27 Claims, 3 Drawing Sheets

ROBUST TEMPORAL DITHERING AND FILTERING

BACKGROUND

1. Field of Invention

The present invention relates generally to pixel based temporal video processing, and more specifically to reducing undesirable contouring artifacts due to bit limiting by applying temporal dithering at a preprocessing stage, and applying temporal filtering at a post-processing stage prior to presentation.

2. Background of Invention

Dithering is a video processing technique used to improve the quality of video images which are displayed on a device with a lower resolution lower than the original image. An example of this would be displaying 10-bit video on a 6 or 8-bit display device. Simple truncation or rounding to nearest integer produces contouring artifacts in the areas of the still video with slow spatially varying brightness or color. In order to avoid contouring artifacts, the least significant truncated bits are used to generate a dither signal. The dither signal is a single bit signal, which is added to the least significant bit of the image after truncation. By proper selection of the dithering signal, many contouring artifacts can be eliminated. Different dithering techniques exist to create dither signals. Most important techniques are evaluated with respect to the quality of the result and cost of implementation.

There are two main prior art approaches to dithering. One approach to dither generation is by use of an error diffusion algorithm. A binary threshold (equal to the half of the maximum signal amplitude) is applied to the input signal 105. The error from the threshold operation is added to the neighboring pixels so that it does not accumulate. Hence, the average dithering signal value approaches the amplitude of the input signal 105. The binary dither pattern exhibits random structure. The error can be diffused spatially, by adding four spatially neighboring weighted error terms to the input pixel prior to apply the threshold. This approach can be simplified by using two error terms. Prior art error diffusion dithering is traditionally applied spatially, such that the dithering algorithm does not change from one frame to another. In this case, although the contouring artifacts are greatly reduced, the dithering pattern is static and can be perceptually annoying.

Another known approach is to construct a binary dither signal using predetermined fixed size binary patterns. A unique dither pattern exists for each discreet input signal 105 amplitude. The average signal value in a dither pattern corresponds to the signal amplitude that this pattern represents.

Several prior art methods have been proposed to improve the visual appearance of the dither patterns by applying temporal perturbations to the dither pattern itself. One such proposal is to use pseudo-random spatial-temporal dither. A 4 by 4 by 4 dither matrix is constructed such that the mean value along the horizontal, vertical and temporal axes is always zero. This zero mean dither signal is added to input signal 105 prior to truncation. Another proposal is spatial dithering with pixel adaptive spatial dither patterns and deterministic temporal perturbations. This approach also uses predetermined dither patterns. In order to dither a two bit signal, a 2 by 2 dither matrix is proposed with the number of ones equal to the input 2-bit magnitude. The 2 by 2 matrix changes for odd and even frames. Although applying these temporal patterns reduces contouring artifacts and the visual static pattern to some extent, a greater level of reduction at a lower computational cost would be desirable.

Furthermore, dithering is typically performed at a display level, to truncate video output according to the limitations of specific display hardware. For example, where a 10 bit single is being dithered for output on an 8 bit display, no provision is made for display of that signal on hardware with a limitation greater than 8 bits. It would be further desirable to condition a signal for transmission to any output device independent of output resolution, such that the signal can be displayed at the native resolution of the device, or at a simulated higher resolution if the device supports such display.

SUMMARY OF INVENTION

A temporal dithering manager uses temporal dithering to reduce contouring artifacts due to bit limiting. The temporal dithering manager truncates low order bits of an input signal, creates a temporal dither signal based on the truncated low order bits and applies the temporally created dither signal to the truncated signal. In some embodiments, a temporal filtering manager applies a temporal filter to the truncated signal, thereby improving the quality of the truncated signal. In some embodiments, creating the temporal dither signal comprises applying a binary threshold to the input signal. In other embodiments, deterministic dither patterns are used to create the dither signal. In some embodiments in which a temporal filter is applied to the truncated signal, an infinite impulse response filter is used. In other embodiments, a finite impulse response filter is applied. In some embodiments, the temporal dithering is applied at a preprocessing stage, and the temporal filtering at a post-processing stage.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
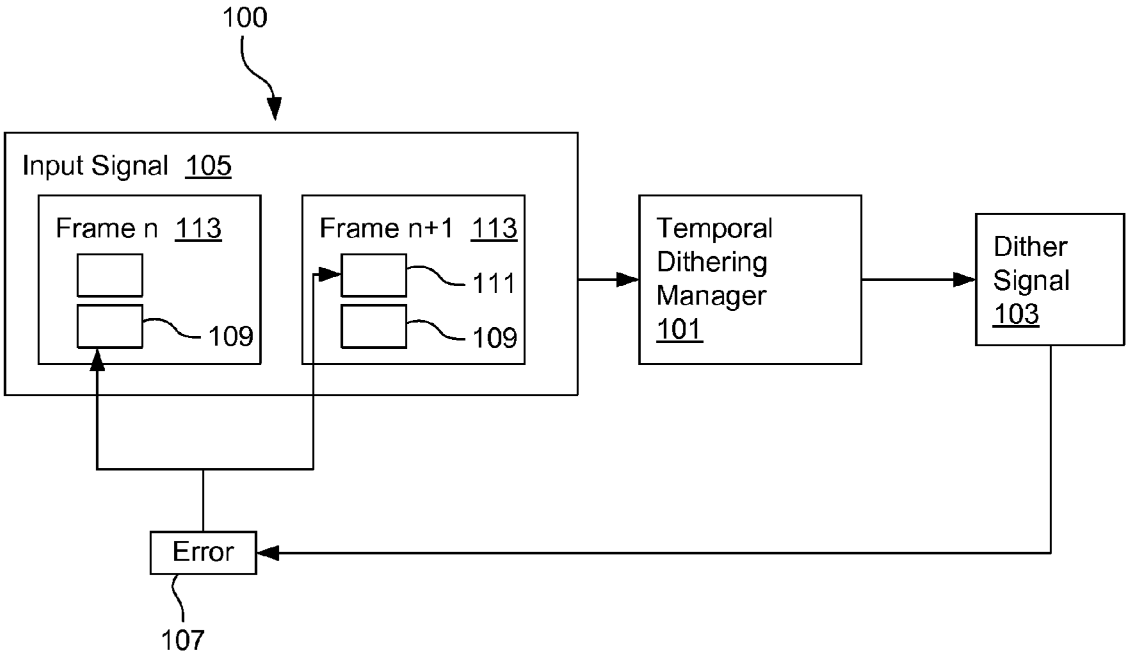
FIG. 1 is a block diagram, illustrating a high level overview of a system for performing some embodiments of the present invention.

FIG. 1 illustrates a high level overview of a system 100 for performing some embodiments of the present invention. As illustrated in FIG. 1, a temporal dithering manager 101 truncates an input signal 105, creates a spatial, temporal error diffusion dither signal 103 and applies it to the truncated input signal 105, according to some embodiments of the present invention. It is to be understood that although the temporal dithering manager 1001 is illustrated as a single entity, as the term is used herein a temporal dithering manager 101 refers to a collection of functionalities which can be implemented as software, hardware, firmware or any combination of the three. Where a temporal dithering manager 101 is implemented as software, it can be implemented as a standalone program, but can also be implemented in other ways, for example as part of a larger program, as a plurality of separate programs, or as one or more statically or dynamically linked libraries.

In the embodiments illustrated in FIG. 1, the temporal dithering manager 101 spatially (e.g., vertically) propagates the error 107 to a neighboring (e.g., vertically neighboring) element 109, and temporally to a co-located element 111 within the next frame 113. In one embodiment the error weights are equal to 0.5. Of course, other weights can be used, as long as they sum to unity. The dithering threshold and error weights can be fixed or randomly modulated, according to various possible methodologies the use of which will be readily apparent to those of ordinary skill in the relevant art in light of this specification.

The temporal dithering manager 101 can apply random threshold perturbations (not illustrated) to the error 107 to further reduce any visible correlation in a dither pattern therein. An important advantage of this method over the traditional error diffusion methods is that the dithering pattern changes with each frame 113, because temporal error 107 is used. The dithering pattern is not static and hence, perceptual quality of the dithered result is superior compared to any spatial error diffusion technique.

Another important advantage is that the method breaks dependency between the pixels within the scan line, and hence can be efficiently implemented for a single instruction stream, multiple data stream (SIMD) processor. Since horizontally neighboring pixels are processed independently, they can be processed in parallel. The memory cost of applying this method is one frame buffer memory, which is utilized to keep the temporal error terms. This additional memory cost overhead (although it can be quite significant for an embedded consumer device) is not significant for a modern computer system.

Figure 2:
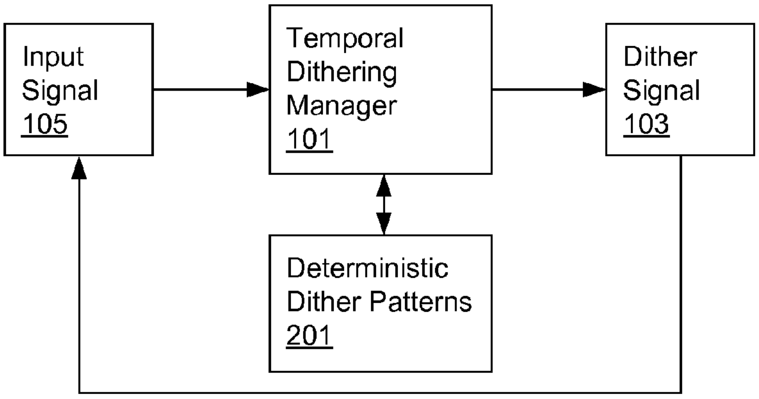
FIG. 2 is a block diagram, illustrating a temporal dithering manager generating a dither signal by using deterministic dither patterns, according to some embodiments of the present invention.

For example, in an embodiment on which this methodology is instantiated to execute on Altivec® (Motorola's PowerPC SIMD extension), the computational cost is 12 vector instructions per a vector of 16 elements:

load input component vector
load error vector corresponding to the current line
load error vector corresponding to the line above
average two error vectors—form the final error vector
mask truncated low order bits from the pixels vector—form vector of truncated low order bits
add vector of truncated low order bits to the final error vector—form sum vector
compare sum vector with the threshold
select output dither vector based on the comparison result
subtract output dither vector from the sum vector—form new error vector
add dither vector to the input component vector
store resulting output component vector
store new error vector FIG. 2 illustrates the temporal dithering manager 101 generating a dither signal 103 by using deterministic dither patterns 201, according to another embodiment of the present invention. One feature of this methodology in some embodiments is that the dithering patterns 201 are constructed such that the temporal average dither value is equal to the input value 105. Application of this methodology is best illustrated by the following example.

Figure 3:
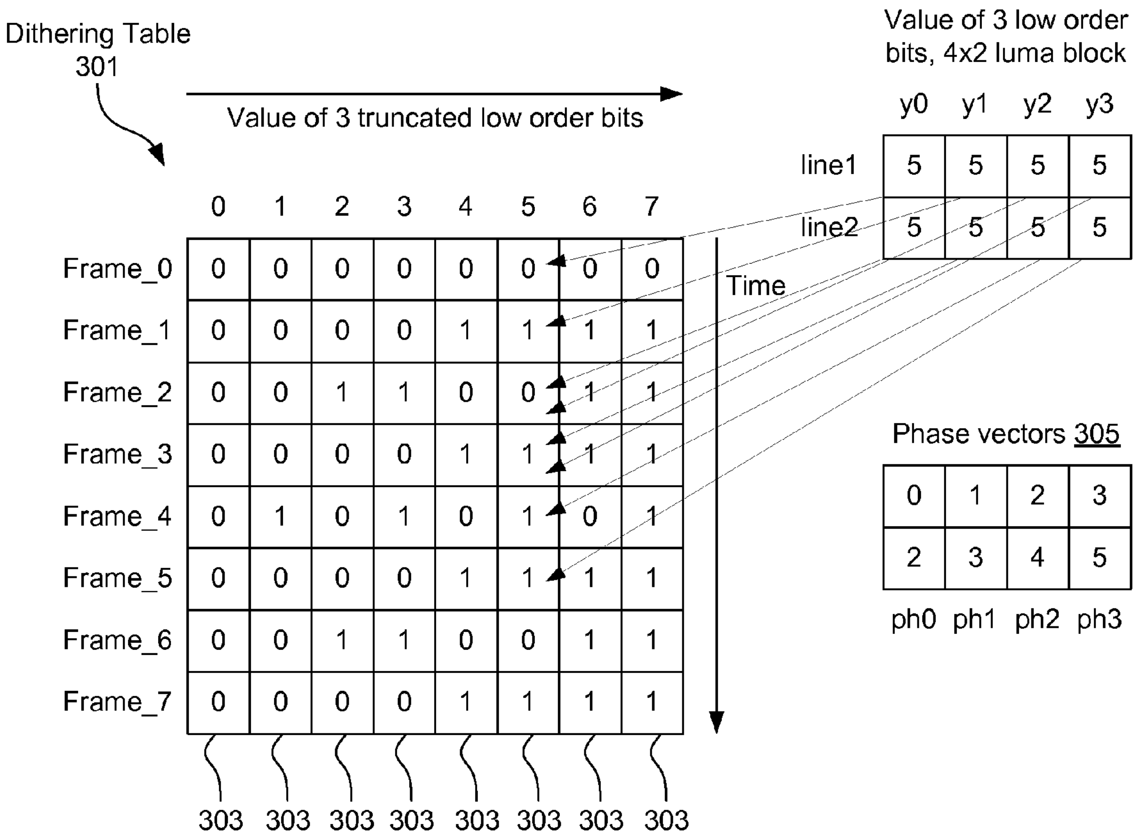
FIG. 3 is a block diagram, illustrating a dithering table which consists of 8 sub-tables, according to some embodiments of the present invention.

Consider the case of 3 bit truncation, in which the magnitude of the truncated component of the pixel is in the range from 0 to 7. FIG. 3 illustrates a resulting dithering table 301, which consists of 8 sub-tables 303, one for each possible 3 bit value to be dithered. In FIG. 3, the sub-tables 303 are represented by the columns in the table 301.

The number of ones in a sub-table 303 is equal to the value that this sub-table 303 is assigned to dither. The sub-table 303 for input zero has no elements equal to one. The sub-table 303 for input seven has seven elements equal to one. The dither sub-table 303 can be addressed by the 3 bit value of the truncated component. The dither entry in turn can be selected by uniform pseudo-random variable in the range 0 to 7. Alternatively the entries in the sub-tables 303 can be perturbed temporally in a pseudo random order. In that case the sub-tables 303 can be accessed sequentially, which simplifies the table addressing. FIG. 3 illustrates one of the possible dithering tables 301 that can be used to dither three truncated three low order bits. After the sequence of 8 still frames (which corresponds to one temporal period), the dithered average value per pixel would approach the value of the truncated component of that pixel.

In one embodiments, in order to reduce spatial correlations horizontally and vertically, neighboring pixels access the dithering look up table 301 using different temporal phases. The phase vector 305 provides the initial phase (offset for the look up table 301 starting address) for the pixels within one horizontal line. The collection of phase vectors 305 provides different initial phases for the pixels within the neighboring lines. The horizontal and vertical phase values are pseudo random numbers. The length of the horizontal phase vector 305 determines the period of the pseudo random horizontal phase in horizontal direction. The number of the horizontal phase vectors 305 determines the period of the pseudo random phase in vertical direction. If the initial signal is highly correlated as in the case of large areas of constant color, the length of the phase vector 305 and the number of phase vectors 305 will determine the amount of randomness that would be added by the dithering process spatially.

In embodiments in which the methodology is not hardwired but implemented with an instruction set, programmable options such has the following are available design parameters:

The size of the dithering look up table 301.
The content of the dithering look up table 301.
The length of the horizontal phase vector 305.
The number of the horizontal phase vector 305.
The content of the horizontal phase vectors 305.

Such programmability allows optimal tuning of the dithering parameters achieving superior perceptual quality.

Some advantages of this method, compared to other methods of dithering with fixed patterns or random noise, include:

Temporal and spatial random perturbations make dithering pattern in-visible

The value of temporal average of dithering pattern approaches to the value of the corresponding truncated input component.

Figure 4:
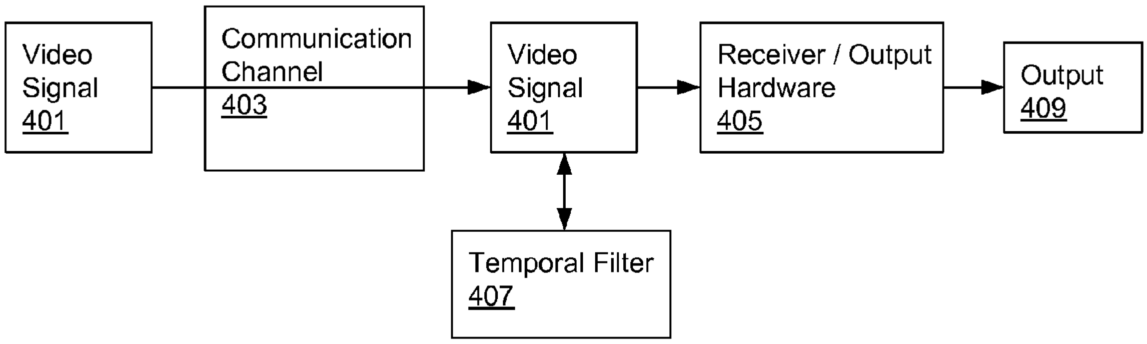
FIG. 4 is a block diagram, illustrating applying temporal dithering at a preprocessing stage, and applying temporal filtering at a post-processing stage, according to some embodiments of the present invention.

The cost of the dither look up table 301 is negligible compared to the size of the video frame buffer. The Altivec® computational cost of the dithering operation is 7 vector instructions per vector of 16 pixel elements, assuming availability of a vector look-up:

load input pixels vector mask truncated low order bits from the pixels vector—form vector of truncated low order bits load phase vector 305 add vector of truncated low order bits with the phase vector 305—form address vector vector look up of the binary dithering pattern using address vector add dithering pattern with the input pixels vector store resulting pixels vector As illustrated in FIG. 4, in some embodiments of the present invention, the dithering methodologies described above in conjunction with FIGS. 1, 2 and/or 3 can be used to preprocess a video signal 401 prior to sending it through a communication channel 403 with a reduced number of bits per pixel. Where the receiver 405 is capable of reproducing the full dynamic range of the dithered and bit limited video, then using applying a temporal filter 407 on the receiving end can recover lost bits from truncation. This of course increases the peak signal to reconstructed image measure (PSNR), and improves the quality of the display output 409 where the output hardware 405 is sufficient. Additionally, application of the temporal filter 407 greatly reduces flickering due to temporal nature of the dither process.

Figure 5:
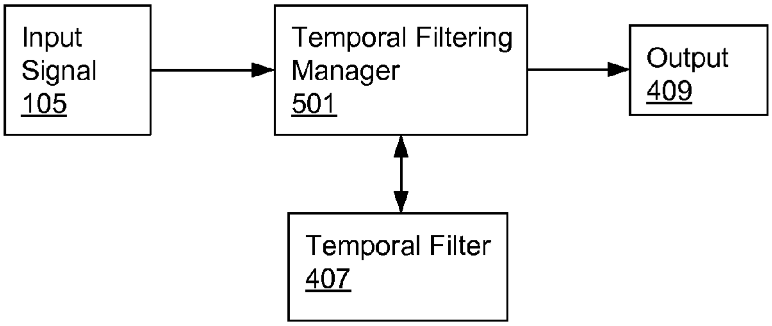
FIG. 5 is a block diagram, illustrating a temporal filtering manager applying temporal filtering to a truncated signal, according to some embodiments of the present invention.

FIG. 5 illustrates a temporal filtering manager 501 performing such filtering according to some embodiments of the present invention. The temporal filtering manager 501 applies a temporal filter 407 within still picture regions of the input signal 105, in order to preserve the original motion sharpness and avoid motion blur. Various temporal filters 407 can be applied. Two specific types of filters 407, infinite impulse response (IIR) and finite impulse response (FIR), are discussed herein as examples. In other embodiments of the present invention, other types of temporal filters 407 can be applied as desired.

The temporal filtering manager 501 can apply the IIR filter in the case of error diffusion or temporal dither. Typically, an IIR filter uses only one frame delay. The temporal filtering manager 501 adjusts the IIR filter coefficient, to make it adaptive to the level of noise and motion. If the noise variance (Sv) is small or the motion (Mv) at the filtered pixel is high, then the temporal filtering manager 501 makes the coefficient K large and the filter is weak. If the noise variance is high and the motion is undetectable, then the temporal filtering manager 501 makes the coefficient K small and the filter is strong.

The temporal filtering manager 501 can apply the known Kalman equations to provide a motion adaptive filter. For example, the temporal filtering manager 501 can compute motion activity for every frame by computing square of the difference of the 2×2 pixel means of the current and previous frames. Such a small block size achieves higher precision of motion detection. Of course, in other embodiments, the temporal filtering manager 501 can use a different block size as desired.

Two specific formulas for IIR filters are illustrated in Table 1. Of course, variations on the formulas illustrated in Table 1 can be used as desired. The application mechanics of such variations will be readily apparent to those of ordinary skill in the relevant art in light of this specification.

TABLE 1

```
1. Simple IIR filter with fixed filter coefficient:
If ( |X(t) − Y(t−1)|<Threshold )
   Y(t) = (1−K) * Y(t−1) + K * X(t)
ELSE
   Y(t) = X(t)
2. Motion adaptive Kalman IIR filter
Mv(t) = (Mean(t) − Mean(t−1))^2 + (Mv(t−1) − K(t−1) * Mv(t−1));
K(t) = Mv(t)/(Mv(t)+Sv)
Y(t) = Y(t−1) + K(t)*(X(t)−Y(t−1))
```

Where:
Threshold - motion threshold
K - simple IIR filter coefficient (fixed value)
K(t) - Kalman IIR filer coefficient
Mv(t) - Motion noise variance (high when the motion is high)
Sv - Signal noise variance due to dithering (fixed, depends on (n−m))
Mean(t) - Mean image at time t, computed as mean of 2x2 pixel blocks
Mean(t−1) - Mean image at time t − 1, computed as mean of 2x2 pixel blocks
X(t) - input n bit component with (n−m) lsb equal to 0
Y(t) - output n bit component
Y(t−1) - output component with one frame delay In some embodiments of the present invention, the temporal filtering manager 501 uses a FIR filter in conjunction with temporal dither. In some embodiments, the support of the FIR averaging filter is equal to the period of the temporal dither. For example, 2-bit dither requires 4 frames buffer queue. Although this type of filter fully recovers the original dynamic range, the cost of this filter is higher than of the IIR filter due to larger frame queue size.

A specific formula for FIR filters is illustrated in Table 2. Of course, variations on this formula can be used as desired. The application mechanics of such variations will be readily apparent to those of ordinary skill in the relevant art in light of this specification.

TABLE 2

FIR filter equation:

```
n − m = p
k = 2^(p−1)
AccX = X(t)
MaxDelta = 0
FOR i = 1 to K
   Delta(i) = |X(t) − X(t−i)|
   MaxDelta = MAXIMUM(Delta(i), MaxDelta)
   AccX = AccX + X(t−i)
ENDFOR
IF ( MaxDelta < Threshold)
   Y(t)=AccX
ELSE
   Y(t) = X(t) * k
```

Where:
Threshold - motion threshold
X(t-i) - input m bit component delayed by i frames
Y(t) - output n bit component at time t
Delta(i) - absolute difference between the current component and component delayed y i frame
MaxDelta - maximum absolute difference between the current component and any previous component within k frames delay
AccX - sum of k input components
n - number of bits per input component
m - number of bits per component after truncation
p - number of truncated bits Some embodiments of the present invention comprise two stages: the pixel dynamic range reduction stage that utilizes temporal dither, and the pixel dynamic range expansion stage that utilizes a temporal filter 407. In some embodiments, a novel temporal dithering methodology is applied with or without the filtering stage as desired.

Some embodiments of the present invention are instantiated in a high end computer based professional video editing system. Digital video production workflow can include capture, post-production, archival, distribution, and presentation. Modern high end video cameras can capture digital video in 10 or 12 bit per component resolution using high throughput channels such as 4×Infiniband over fiber optic, Dual HD-SDI over copper cable (SMPTE 372M) or HD-SDI over copper cable (SMPTE 292M). In some instances, for production or distribution purposes, it is desirable to reduce the component dynamic range to 8 bits per component. The temporal dithering stage of the present invention can be used to perform bit limiting with minimum perceptual quality degradation.

High quality digital cinema presentation requires 10 bits per component for contrast ratio 1000:1, 11 bits per component for contrast ration 2000:1, and 12 bits per component for contrast ration 4000:1. The filtering stage of the present invention can be utilized to expand the dynamic range and, in some cases, achieve the video quality identical to the quality produced by the capturing device.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for reducing contouring artifacts due to bit limiting, the method comprising:

truncating low order bits of an input signal;

creating a temporal dither signal based on the truncated low order bits;

applying the temporally created dither signal to the truncated signal to create a dithered signal;

applying a temporal filter to the dithered signal to recover the truncated bits of the input signal; and outputting the temporally filtered dithered signal.

2. The method of claim 1 wherein creating the temporal dither signal further comprises applying a binary threshold to the input signal from a group of binary thresholds consisting of:

a fixed threshold; and a randomly modulated threshold.

3. The method of claim 1 wherein applying the temporally created dither signal to the truncated signal further comprises:

applying a spatial, temporal error diffusion dither signal to the truncated signal.

4. The method of claim 3 wherein applying a spatial, temporal error diffusion dither signal to the truncated signal further comprises:

spatially propagating the error to a neighboring element in a current frame of the truncated signal; and temporally propagating the error to a co-located element within a next frame of the truncated signal.

5. The method of claim 4 further comprising:

spatially propagating the error to vertically and horizontally neighboring elements in the current frame of the truncated signal in parallel.

6. The method of claim 4 further comprising:

applying pseudo-random perturbations to the error to further reduce any visible correlation in a dither pattern therein.

7. The method of claim 1 wherein creating the temporal dither signal further comprises:

using deterministic dither patterns to create the dither signal.

8. The method of claim 7 further comprising:

constructing deterministic dither patterns such that a temporal average dither value is equal to an input value.

9. The method of claim 7 further comprising:

constructing a table of deterministic dither patterns, the table comprising a plurality of sub-tables, one for each possible value to be dithered.

10. The method of claim 9 wherein:

the number of ones in each sub-table is equal to a value which that sub-table is assigned to dither.

11. The method of claim 9 further comprising:

using a value of corresponding truncated bits for addressing a dither sub-table; and performing a step from a group of steps consisting of:

selecting a dither entry by using a uniform pseudo-random variable within a range of possible values for corresponding truncated bits; and selecting a dither entry sequentially, the entries in the sub-table being perturbed temporally in a pseudo random order.

12. The method of claim 9 further comprising:

accessing the table using different temporal phases for neighboring pixels.

13. The method of claim 12 further comprising:

utilizing a plurality of phase vectors to provide different initial phases for pixels within neighboring horizontal lines.

14. The method of claim 12 further comprising:

using pseudo random numbers for horizontal and vertical phase values.

15. The method of claim 1 wherein applying a temporal filter to the truncated signal further comprises applying a temporal filter from a group of temporal filters consisting of:

an infinite impulse response filter; and a finite impulse response filter.

16. The method of claim 15 wherein applying a temporal filter to the truncated signal further comprises applying an infinite impulse response filter, the method further comprising:

adjusting an infinite impulse response filter coefficient to make the filter adaptive to a variance from a group of variances consisting of:

a noise variance; and a motion variance.

17. The method of claim 15 wherein applying a temporal filter to the truncated signal further comprises applying an infinite impulse response filter, the method further comprising:

applying Kalman equations to provide a motion adaptive filter.

18. The method of claim 1 further comprising:

applying temporal dithering at a preprocessing stage; and applying temporal filtering at a post-processing stage.

19. A computer program product having a computer-readable storage medium storing a computer program for reducing contouring artifacts, the computer program comprising:

program code for truncating low order bits of an input signal;

program code for creating a temporal dither signal based on the truncated low order bits;

program code for applying the temporally created dither signal to the truncated signal to create a dithered signal;

program code for applying a temporal filter to the dithered signal to recover the truncated bits of the input signal; and program code for outputting the temporally filtered dithered signal.

20. The computer program product of claim 19 wherein the program code for applying the temporally created dither signal to the truncated signal further comprises:

program code for applying a spatial, temporal error diffusion dither signal to the truncated signal.

21. The computer program product of claim 19 wherein the program code for creating the temporal dither signal further comprises:

program code for using deterministic dither patterns to create the dither signal.

22. The computer program product of claim 19 wherein the program code for applying a temporal filter to the truncated signal further comprises program code for applying a temporal filter from a group of temporal filters consisting of:

an infinite impulse response filter; and a finite impulse response filter.

23. The computer program product of claim 19 further comprising:

program code for applying temporal dithering at a preprocessing stage; and program code for applying temporal filtering at a post-processing stage.

24. A computer system for reducing contouring artifacts due to bit limiting, the system comprising:

a temporal dithering manager comprising a processor configured to:

truncate low order bits of an input signal;

create a temporal dither signal based on the truncated low order bits; and apply the temporally created dither signal to the truncated signal to create a dithered signal;

a temporal filtering manager in communication with the temporal dithering manager, the temporal filtering manager comprising a processor configured to:

apply a temporal filter to the dithered-signal to recover the truncated bits of the input signal; and an output module in communication with the temporal filtering manager, the output module comprising a processor configured to output the temporally filtered dithered signal.

25. The computer system of claim 24 wherein the temporal dithering module is further configured to:

apply a spatial, temporal error diffusion dither signal to the truncated signal.

26. The computer system of claim 24 wherein the temporal dithering module is further configured to:

use deterministic dither patterns to create the dither signal.

27. The computer system of claim 24 wherein the temporal filtering module is further configured to apply a temporal filter from a group of temporal filters consisting of:

an infinite impulse response filter; and a finite impulse response filter.

* * * * *